US008771523B1

(12) United States Patent
Dirubio et al.

(10) Patent No.: US 8,771,523 B1
(45) Date of Patent: Jul. 8, 2014

(54) POLYDISPERSE COMPOSITIONS AND METHODS FOR ELIMINATING VOLATILE ORGANIC COMPOUNDS

(71) Applicant: Xeorx Corporation, Norwalk, CT (US)

(72) Inventors: Christopher Auguste Dirubio, Webster, NY (US); William C. Dean, Pittsford, NY (US); Jeffrey C. Shelton, Portland, OR (US); Patricia A. Wang, Lake Oswego, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/752,634

(22) Filed: Jan. 29, 2013

(51) Int. Cl.
*B01D 1/22* (2006.01)
(52) U.S. Cl.
USPC ............ 210/767; 528/480; 528/501; 528/503
(58) Field of Classification Search
None
See application file for complete search history.

(56) References Cited

U.S. PATENT DOCUMENTS

| 4,029,827 | A | 6/1977 | Imperial et al. |
| 4,101,686 | A | 7/1978 | Strella et al. |
| 4,185,140 | A | 1/1980 | Strella et al. |
| 4,251,777 | A | 2/1981 | Sartorius et al. |
| 5,157,445 | A | 10/1992 | Shoji et al. |
| 5,512,409 | A | 4/1996 | Henry et al. |
| 5,516,361 | A | 5/1996 | Chow et al. |
| 6,183,929 | B1 | 2/2001 | Chow et al. |
| 6,353,087 | B1 * | 3/2002 | Chang-Mateu et al. ...... 528/481 |
| 6,740,691 | B1 * | 5/2004 | Lorteije et al. ................ 523/328 |
| 7,208,259 | B2 | 4/2007 | Badesha et al. |
| 2010/0178521 | A1 * | 7/2010 | Byrne et al. .................. 428/450 |
| 2010/0248132 | A1 * | 9/2010 | Sensui ..................... 430/137.16 |

\* cited by examiner

*Primary Examiner* — Marc Zimmer
(74) *Attorney, Agent, or Firm* — Pillsbury Winthrop Shaw Pittman LLP (57) ABSTRACT

A composition that has a low volatile organic compound (VOC) content and methods for producing compositions having a low VOC content. The composition, such as a solid ink and/or toner release oil composition, may include less than about 0.15% by weight VOCs that have a sufficient vapor pressure at the operating temperature of printing device to enter the gas phase at the operating temperature of the printing device.

13 Claims, 6 Drawing Sheets

POLYDISPERSE COMPOSITIONS AND METHODS FOR ELIMINATING VOLATILE ORGANIC COMPOUNDS

TECHNICAL FIELD

This disclosure is generally directed to solid ink and toner release oil compositions having low volatile organic compound (VOC) emissions. More specifically, this disclosure is directed to low-VOC emission compositions including a polydisperse oil, and processes for making such compositions.

BACKGROUND

In xerographic and solid ink printing applications, it is desirable to use release agent oils which are cost effective, clear, colorless, odorless or nearly so at room temperature and at operating temperatures, free of additives (such as acids, bases, peroxides, heavy metals, and the like) that can interfere with the fusing/transfer and sheet release performance of the fusing/transfer system and associated hardware, and free of or capable of producing minimal volatile emission compounds over the service life of the release agent oil.

In a typical solid ink print process, a thin film of oil is applied to the surface of a rotating metal drum, and the print heads jet the ink onto the oiled surface of the drum. Once the image is built on the drum, it is transferred to a media, such as a paper or a substrate. The oil acts as a release layer and reduces the adhesive force of the ink to the drum surface, which aids in the transfer efficiency of the ink from the drum surface to the media. In order to achieve high transfer efficiency and excellent print quality, the adhesive force between the media and the ink should be higher than the adhesive force between the ink and the oiled drum surface. Without the oil, the drum-ink adhesion is too high, resulting in poor transfer efficiency and poor image quality.

Various conventional oil compositions for a printing system have been proposed, the compositions having a wide range of additives and constituent materials. U.S. Pat. No. 6,183,929 to Chow et al. discloses a fuser member comprising a substrate, a layer thereover comprising a polymer and, on the polymeric layer, a coating of a release agent comprising a mixture of (a) an organosilane polymer concentrate containing amino-substituted or mercapto-substituted organosiloxane polymers, the concentrate having a viscosity of from about 50 to about 500 cSt, and (b) a nonfunctional organosiloxane polymer diluent having a viscosity of from about 100 to about 2,000 cSt. U.S. Pat. No. 7,208,259 to Badesha et al. discloses a fuser member comprising a substrate, a layer thereover comprising a polymer, and, on the polymeric layer, a coating of a release agent comprising a mixture of (a) an organosiloxane polymer concentrate containing amino-substituted organosiloxane and (b) a nonfunctional organosiloxane polymer diluent. U.S. Pat. No. 4,029,827 to Imperial et al. discloses polyorganosiloxanes having functional mercapto groups, which are applied to a heated fuser member in an electrostatic reproducing apparatus to form thereon a thermally stable, renewable, self-cleaning layer having superior toner release properties for electroscopic thermoplastic resin toners. The disclosures of U.S. Pat. Nos. 6,183,929, 7,208,259, and 4,029,827 are totally incorporated herein by reference in their entireties.

U.S. Pat. No. 4,101,686 to Strella et al. and U.S. Pat. No. 4,185,140 to Strella et al. disclose polymeric release agents having functional groups such as carboxy, hydroxyl, epoxy, amino, isocyanate, thioether, or mercapto groups. U.S. Pat. No. 5,157,445 to Shoji et al. discloses toner release oil having a functional organopolysiloxane of a certain formula. U.S. Pat. No. 4,251,777 to Martin discloses compositions containing organopolysiloxanes and thiofunctional polysiloxanes having at least one mercapto group which are effective as corrosion inhibitors and as release agents for metal substrates. U.S. Pat. No. 5,512,409 to Henry et al. teaches a method of fusing thermoplastic resin toner images to a substrate using amino functional silicone oil over a hydrofluoroelastomer fuser member. U.S. Pat. No. 5,516,361 to Chow et al. teaches a fusing member having a thermally stable FKM hydrofluoroelastomer surface and having a polyorgano T-type amino functional oil release agent. The disclosures of U.S. Pat. Nos. 4,101,686, 4,185,140, 5,157,445, 4,251,777, 5,512,409, 5,516,361, and 4,101,686 are totally incorporated herein by reference in their entireties.

These conventional release layer oils, such as typical silicone oils, emit volatile organic compounds (VOCs) when heated by the drum surface. For example, thermal degradation of release agents may result in the generation of volatile byproducts including, for example, formaldehyde ($CH_2O$), formic acid ($HCO_2H$), carbon dioxide ($CO_2$), carbon monoxide (CO), hydrogen ($H_2$), methanol ($CH_3OH$), ammonia ($NH_3$), hydrogen sulfide ($H_2S$), trifluoropropionaldehyde ($CF_3CH_2CHO$), and the like. The abatement system of the solid ink printer pulls air, dust, particles, and volatile chemicals out of the printer cavity and into the environment with a fan, thereby releasing the VOCs into the environment. Many VOCs are hazardous to human health and harmful to the environment. In order to meet increasingly stringent environmental certifications (such as Blue Angel certification) and governmental regulations (such as EPEAT and EcoLogo), the VOCs emitted by the oil and exhausted into the environment should be reduced significantly.

As a result, there exists a need to develop an oil composition that exhibits low VOC emissions that can be produced without chemically altering or degrading the oil, while minimizing the change in viscosity of the oil.

SUMMARY

According to aspects illustrated herein, there is provided a composition including a polydisperse polymer having a viscosity in the range of from about 10 cSt to about 700 cSt, where the polydisperse polymer emits less than about 0.5 PPM (methanol equivalent) volatile organic compounds when heated to a temperature of from about 50° C. to about 250° C., and where the polydisperse polymer includes less than about 0.15% by weight volatile organic compounds (VOCs) having a molecular weight less than about 1500 g/mol.

In some embodiments, the present disclosure relates to a method of preparing a polydisperse oil having a low content of volatile organic compounds (VOCs), the method including flowing polydisperse oil comprising VOCs over a surface to form a layer of polydisperse oil, and forming a stripped polydisperse oil substantially free of VOCs having a molecular weight less than about 1500 g/mol by heating the layer of polydisperse oil at an effective temperature to remove VOCs having a molecular weight less than about 1500 g/mol.

EMBODIMENTS

In this specification and the claims that follow, singular forms such as "a," "an," and "the" include plural forms unless the content clearly dictates otherwise. All ranges disclosed herein include, unless specifically indicated, all endpoints and intermediate values. The term "at least one" refers, for example, to instances in which one of the subsequently described circumstances occurs, and to instances in which more than one of the subsequently described circumstances occurs.

As used herein, the modifier, "about," used in connection with a quantity is inclusive of the stated value and has the meaning dictated by the context (for example, it includes at least the degree of error associated with the measurement of the particular quantity). When used in the context of a range, the modifier, "about," should also be considered as disclosing the range defined by the absolute values of the two endpoints. For example, the range, "from about 2 to about 4," also discloses the range, "from 2 to 4."

The term "polydisperse" refers, for example, to a polymer, composition or oil comprising polymer molecules containing individual polymerized repeating units where the degree of polymerisation (DP) or chain length varies such that the percentage of the number of molecules in the composition or oil of a particular molecular weight forms a distribution, such as a Gaussian distribution. The distribution may also be bimodal, trimodal or tetramodal where more than one polymer composition having a particular average molecular weight is blended together to form the polydisperse composition or oil. The individual polymerized molecules making up the distribution may have differing molecular weights that vary by the molecular weight of the repeating unit. For example, the distribution of individual polymerized molecules may be made up of polymers that have molecular weights that differ by the mass of one of the repeat unit(s).

The term "functionalized" refers, as used in the expression functionalized polydisperse oil or composition component (hereinafter "functionalized polydisperse oil"), for example, to a polydisperse oil having functional groups pendant from at least some of the polymer molecules therein. For instance, "functionalized polydisperse oil" may refer to polydisperse oils having functional groups that are capable of interacting with the fuser member or transfer member surface to form a thermally-stable barrier to toner or ink, which adheres to the metal, glass, or other substrate of the fuser/transfer member and provides a thin coating which has excellent release properties for the toners or inks used in the printing process. "Functionalized polydisperse oil" further refers to polydisperse oils having functional groups that chemically react with fillers present on the surface of a fuser/transfer member, so as to reduce the surface energy of the fillers so as to provide better release of toner particles or ink from the surface of the fuser/transfer member. If the surface energy is not reduced, the toner particles or ink will tend to adhere to the fuser/transfer roll surface or to filler particles on the surface of the fuser/transfer roll, which will result in copy quality defects. The term "functional group" refers, for example, to a group of atoms arranged in a way that determines the chemical properties of the group and the molecule to which it is attached. Examples of functional groups include carboxy, hydroxyl, epoxy, amino, isocyanate, thioether, mercapto, and the like, and combinations thereof.

As used herein, the term "volatile organic compound" or VOC refers, for example, to an organic compound having a sufficient vapor pressure at a predetermined temperature such that the organic compound will enter the gas phase at the predetermined temperature. In some embodiments, such a predetermined temperature may be in the range of from about 40° C. to about 250° C. In embodiments, such a predetermined temperature may be in the range of from about 40° C. to about 80° C. In other embodiments, such a predetermined temperature may be in the range of from about 140° C. to about 210° C. In some embodiments, a VOC may be an organic compound that leaves the unstripped bulk fluid (or composition, such as a toner or ink release oil composition, containing a polydisperse oil), at the predetermined temperature, and enters the gas phase (such as by an evaporation process and/or a volatilization process) to an extent that it exists in the gas phase (at the predetermined temperature) at concentration of greater than about 1.5 PPM (methanol equivalent) as measured using a Flame Ionization Detector (FID), or exist in the gas phase at concentration of from about 1.5 PPM to about 100 PPM (methanol equivalent) as measured using a Flame Ionization Detector (FID). In some embodiments, a VOC may be an organic compound that leaves the unstripped bulk fluid (or composition, such as a toner or ink release oil composition, containing a polydisperse oil), at the predetermined temperature, and enters the gas phase (such as by an evaporation process and/or a volatilization process) to an extent that it exists in the gas phase at concentration of greater than about 5 PPM (methanol equivalent) as measured using a Flame Ionization Detector (FID), or exist in the gas phase (at the predetermined temperature) at concentration of from about 5 PPM to about 50 PPM (methanol equivalent) as measured using a Flame Ionization Detector (FID).

The current disclosure provides a polydisperse polymer and/or polydisperse polymer composition (hereinafter collectively referred to as a "composition" unless expressly noted otherwise), such as a toner or ink release oil composition, containing a polydisperse oil. In embodiments, the composition may comprise a single oil, or may comprise a blend of multiple oils, such as a blend of two or more oils. In embodiments, a composition, such as a toner or ink release oil composition, may contain a polydisperse polymer or a polydisperse oil blend comprising a polydisperse oil (diluent) and a functionalized polydisperse oil.

The viscosity and volatility (and, thus, VOC emissions) of compositions of polydisperse oils, such as a silicone oil compositions, depend on a number of factors including the molecular weight distribution of the polymer molecules in the oil. For example, with respect to polydisperse polymers or compositions, such as polydisperse oils, with a large molecular weight distribution, the low molecular weight molecules are the most volatile because they are bound (via intermolecular forces) more weakly to the other molecules in the oil. As a result, these low molecular weight molecules make the greatest contribution to the VOCs emitted by the heated oil.

VOC emissions are a function of temperature—that is to say, as temperature increases, the molecular weight threshold for volatility also increases. In embodiments (such as for solid ink jet oils, where the drum may be operated at a temperature of, for example, less than about 80° C., such as from about 40° C. to about 60° C., or from about 50° C. to about 55° C.), the low molecular weight molecules that may be removed, such as by evaporation and/or volatilization, by the methods of the present disclosure may be molecules with a molecular weight of, for example, less than about 700 g/mol, such as less than about 550 g/mol, or less than about 450 g/mol.

In some embodiments (such as for fuser oils), the oils may be heated at a higher operating temperature, such as from about 140° C. to about 210° C., or from about 150° C. to about 200° C. At such temperatures, the low molecular weight molecules that may be removed, such as by evaporation and/or volatilization, may be molecules with a molecular weight of, for example, less than about 2000 g/mol, such as less than about 1500 g/mol, or less than about 1000 g/mol, or less than about 800 g/mol.

Increasing the molecular weight of the molecules generally increases the extent of intermolecular forces experienced by polymer molecules, which thereby increases the oil viscosity and decreases the volatility. However, for solid ink jet applications, the duplex ink transfer efficiency decreases rapidly as oil viscosity increases. Thus, while increasing oil viscosity until the low molecular weight fraction becomes negligible should reduce VOC emissions, high viscosity oils exhibit poor transfer efficiency, particularly to the second side of a media during duplex printing.

For fuser applications, while the viscosity of the oil may be higher, it is desirable to minimize the change in the viscosity of the oil because particular applications and imaging devices may require use of an oil having a particular viscosity, and increasing the viscosity of the oil may render the oil less suitable for the intended application or imaging device.

The methods of the present disclosure very selectively strip, such as by removing due to evaporation and/or volatilization, only the most volatile components (such as the VOCs) of the polydisperse polymer or composition, such as a polydisperse oil, without significantly increasing its viscosity, thereby avoiding the problems associated with high viscosity compositions. In the methods of the present disclosure, the selective stripping may be achieved by stirring and heating a thin pool of the polydisperse polymer or composition, such as a polydisperse oil, at relatively low temperatures under a constant air flow of several cubic feet per minute, which results in a low volatility polydisperse polymer or composition, such as a low volatility polydisperse oil, with essentially unchanged viscosity with respect to the original polydisperse polymer or composition, such as a polydisperse oil, or the original components of any blend of such components.

Before stripping, the VOCs in a composition containing VOCs may volatilize when the composition containing VOCs is heated to a predetermined temperature, such that the VOCs are present in the gas phase in a concentration of greater than about 1.5 PPM (methanol equivalent), such as greater than about 5 PPM, or greater than about 10 PPM, as measured using a Flame Ionization Detector (FID).

In embodiments, the compositions of the present disclosure are compositions in which a majority of most of the volatile components has been removed, such as polymer compositions that have been selectively stripped of the VOCs. Accordingly, when the compositions and/or polymer compositions according to the instant disclosure are heated to a predetermined temperature (within the ranges discussed above), the VOC emissions may be lower, such that the VOCs are only present in the gas phase and/or vapor phase (collectively hereinafter referred to as the vapor phase) in a concentration of less than 0.5 PPM (methanol equivalent), such as in a concentration of from 0.001 PPM to about 0.5 PPM (methanol equivalent), or a concentration of from 0.01 PPM to about 0.1 PPM (methanol equivalent). In some embodiments, when the compositions and/or polymer compositions according to the instant disclosure are heated to a predetermined temperature (within the ranges discussed above), the VOC emissions may be lower, such that the VOCs are only present in the gas phase and/or vapor phase (collectively hereinafter referred to as the vapor phase) in a concentration of less than about 0.1 PPM, or less than about 0.08 PPM, or less than about 0.01 PPM, or less than about 0.001 PPM, as measured using FID. In embodiments, the VOC emissions (methanol equivalent) as measured using a Flame Ionization Detector (FID) of a polydisperse oil or functionalized polydisperse oil stripped according to the methods of the instant disclosure may be 10 times less than that of the polydisperse oil or the functionalized polydisperse oil prior to stripping, such as about 15 times less, or about 50 times less, or about 70 times less, or about 80 times less.

Polydisperse Oil Composition (Solid Ink Jet Oils)

In embodiments (such as for solid ink jet oils), the polydisperse polymer or composition may comprise one or more polydisperse oils, such as a first, second, third and/or fourth polydisperse oil each having a viscosity less than about 40 cSt, such as less than about 30 cSt, or less than about 25 cSt. In embodiments, such polydisperse oil(s) may have a viscosity greater than about 5 cSt, such as greater than about 10 cSt, or greater than about 15 cSt. In embodiments, the polydisperse oil may include less than about 0.15% by weight VOCs, such as less than about 0.1% by weight VOCs, or less than about 0.01% by weight VOCs, or less than about 0.001% by weight VOCs, having a molecular weight less than about 700 g/mol, such as less than about 550 g/mol, or less than about 450 g/mol.

In embodiments, the polydisperse oil may be a blended oil comprising a polydisperse oil (diluent) and a functionalized polydisperse oil. The polydisperse oil (diluent) component of the blend for a solid ink jet oil may comprise one or more polydisperse oils, such as a first, second, third, and/or fourth polydisperse oil each having a viscosity less than about 40 cSt, such as less than about 30 cSt, or less than about 25 cSt. The functionalized polydisperse oil component of the blend may have a viscosity much higher than that of the first polydisperse components in the blend. For example, the functionalized polydisperse oil may have a viscosity in the range of from about 200 cSt to about 1200 cSt, such as in the range of from about 400 cSt to about 1000 cSt, or in the range of from about 500 cSt to about 800 cSt.

In embodiments, the polydisperse oil blend may be an ink release oil composition that may include less than about 0.15% by weight VOCs, such as less than about 0.1% by weight VOCs, or less than about 0.01% by weight VOCs, or less than about 0.001% by weight VOCs, having a molecular weight less than about 700 g/mol, such as less than about 550 g/mol, or less than about 450 g/mol. In embodiments, each of the polydisperse components of the blend includes less than about 0.15% by weight VOCs, such as less than about 0.1% by weight VOCs, or less than about 0.01% by weight VOCs, or less than about 0.001% by weight VOCs, having a molecular weight less than about 700 g/mol, such as less than about 550 g/mol, or less than about 450 g/mol.

In embodiments, the polydisperse oil blend may have a content of VOCs having a molecular weight less than about 700 g/mol, such as less than about 550 g/mol, or less than about 450 g/mol, that is at least 10 times less than that of the polydisperse oil or the functionalized polydisperse oil prior to stripping, such as about 15 times less, or about 50 times less, or about 70 times less, or about 80 times less.

In embodiments, the polydisperse oil blend, which may be an ink release oil composition, comprises a functionalized polydisperse oil having a viscosity in the range of from about 200 cSt to about 1200 cSt, such that the blend has a viscosity less than about 40 cSt, such as less than about 30 cSt, or less than about 20 cSt, and includes less than about 0.15% by weight VOCs having a molecular weight less than about 550 g/mol. In embodiments, the polydisperse oil blend has a viscosity greater than about 10 cSt and less than about 40 cSt, such as less than about 30 cSt, or less than about 20 cSt, and includes less than about 0.15% by weight VOCs, such as less than about 0.1% by weight VOCs, or less than about 0.01% by weight VOCs, or less than about 0.001% by weight VOCs, having a molecular weight less than about 700 g/mol, such as less than about 550 g/mol, or less than about 450 g/mol.

The distribution of the molecular weights of the polydisperse oil (diluent) when plotted against the population of individual molecules having the respective molecular weight may be a wide or narrow distribution where the difference between the molecular weight at the lower end of the distribution and the upper end of the distribution is in the range of from about 500 g/mol to about 5000 g/mol, such as where the difference between the molecular weight at the lower end of the distribution and the upper end of the distribution is in the range of from about 800 g/mol to about 3500 g/mol.

In embodiments, before the methods of the present disclosure are used to remove the low molecular weight fraction, the weight percentage of VOCs having a molecular weight at the lower end of the distribution in the range of from about 30 g/mol to about 700 g/mol, such as in the range of from about 50 g/mol to about 550 g/mol, or in the range of from about 70 g/mol to about 450 g/mol may be from about 0.01% to about 3%, such as from about 0.015% to about 1%. Before the methods of the present disclosure are used to remove the low molecular weight fraction (including VOCs having a molecular weight less than about 700 g/mol, such as less than about 550 g/mol, or less than about 450 g/mol), the logarithm of the molecular weight distribution of the first polydisperse oil may be substantially Gaussian.

In embodiments, after the methods of the present disclosure are used to remove the low molecular weight fraction, substantially all of the VOCs, such as at least 90% by weight (relative to the initial weight amount of VOCs that were present), or at least 98% by weight, or at least 99.9% by weight of the VOCs having a molecular weight less than about 700 g/mol, such as less than about 550 g/mol, or less than about 450 g/mol, have been removed. After the aforementioned VOCs are removed, the lowest substantially populated molecular weight (such as greater than 0.001% abundance, or greater than 0.02% abundance relative to the population of the entire molecular weight distribution) at the lower end of the distribution may be in the range of from about 450 g/mol to about 800 g/mol, such as in the range of from about 500 g/mol to about 750 g/mol, or in the range of from about 550 g/mol to about 700 g/mol. After the methods of the present disclosure are used to remove the low molecular weight fraction, a plot of the distribution of the first polydisperse oil departs from a substantially Gaussian distribution because of the removal of the lower molecular weight molecules of the distribution (see the molecular weight distributions plotted in FIGS. 1 and 5, and compare with the molecular weight distributions plotted in FIG. 6).

In embodiments, the viscosity of the polydisperse oil, which may be a solid ink jet release oil composition, before the methods of the present disclosure are used to remove the low molecular weight fraction is within about 4%, such as within a viscosity of about 1%, or a viscosity of within about 0.1%, of the viscosity of the polydisperse oil after the methods of the present disclosure have been used to remove the low molecular weight fraction (including VOCs having a molecular weight less than about 700 g/mol, such as less than about 550 g/mol, or less than about 450 g/mol).

The upper end of the distribution may remain the same before and after methods of the present disclosure are used to remove the low molecular weight fraction and may be in the range of from about 1000 g/mol to about 5000 g/mol, such as in the range of from about 1500 g/mol to about 4000 g/mol, or in the range of from about 2000 g/mol to about 3000 g/mol.

In embodiments, a polydisperse oil of this disclosure may be an unsubstituted organopolysiloxane such as, for example, polydimethylsiloxane (PDMS), diphenylpolysiloxane, or phenylmethylsiloxane. The term "unsubstituted" refers, for example, to oils that do not have functional groups pendant from the polymer molecules therein.

In embodiments, the polydisperse oil has a polydispersity index in the range of from about 1.1 to about 4, such as from about 1.5 to about 2.4.

In embodiments where the polydisperse oil composition is a blended oil comprising a polydisperse oil (diluent) and a functionalized polydisperse oil, the polydisperse oil (diluent) component may have a polydispersity index ($M_w/M_n$) in the range of from about 1.05 to about 4, such as in the range of from about 1.1 to about 3, or in the range of from about 1.2 to about 2.

The functionalized polydisperse oil may have functional groups pendant from at least some of the polymer molecules therein. The functional groups may be, for example, carboxy, hydroxyl, epoxy, amino, isocyanate, thioether, mercapto, carbinol, methacryl, phenol, and the like.

The molecular weight of the functionalized polydisperse oil should be sufficient to achieve a high viscosity functionalized polydisperse oil (relative to the viscosity of the polydisperse oil diluent). In this regard, the molecular weight of the functionalized polydisperse oil to be used in the blended compositions according to the present disclosure may ultimately depend on how the polymer is functionalized and the specific identity of the functional groups that are present on the polymer chains. In embodiments, the average molecular weight (and optionally the polydisperity index) of the functionalized polydisperse oil may be selected such that the functionalized polydisperse oil possesses a viscosity in the range of from about 200 cSt to about 1200 cSt. For example, the average molecular weight (and optionally the polydispersity index) of the functionalized polydisperse oil may be in a range that is sufficient to achieve a viscosity in the range of from about 200 cSt to about 1200 cSt, such as a number average molecular weight that is sufficient to achieve a viscosity in the range of from about 200 cSt to about 1200 cSt, or a viscosity in the range of from about 400 cSt to about 1000 cSt, or a viscosity in the range of from about 500 cSt to about 800 cSt. In embodiments, such a functionalized polydisperse oil with the above-mentioned viscosities may have a polydispersity index ($M_w/M_n$) of from about 1.1 to about 6, such as about 1.2 to about 4.

In embodiments, the functionalized polydisperse oil may be prepared by any suitable method, such as by reacting amino-functionalized polydimethylsiloxanes.

An exemplary method for making an amino functionalized polydimethylsiloxane fuser or ink jet transfer member oil may include making an amine-containing polydimethylsiloxane concentrate and subsequently diluting with nonfunctional polyorganosiloxane oil to provide a mixture with a distribution of amines in a large group of siloxanes. In making the concentrate, a broader distribution of the amine functionality mono-, di-, and tri-amino may be obtained. In a typical reaction, an end blocker, amino siloxane, catalyst, and octamethyltetrasiloxane are reacted in a vessel at elevated temperature (of from about 100 to about 210° C., or from about 145 to about 185° C.) for a desired time (of from about 2 to about 15 hours, or from about 5 to about 10 hours). During this time period, the ring opening and bond reformation occurs, resulting in random distribution of amine functionality on the polydimethylsiloxane chains. The residual catalyst is deactivated. This is generally followed by final removal of the volatiles under heat (for example, a temperature from about 175 to about 250° C., or from about 195 to about 220° C.) and pressure (for example, of from about 0.5 to about 5 torr, or from about 1 to about 2 torn). In embodiments, the resulting reaction product is then diluted with non-functional polydimethylsiloxane for use as fuser or solid ink jet oil. The amount and viscosity of the non-functional polydimethylsiloxane depends on what is required for the final oil.

Polydisperse Oil/Functionalized Polydisperse Oil Blend (Solid Ink Jet Oils)

In embodiments, the polydisperse oil (diluent) and the functionalized polydisperse oil are combined to produce a blend. Blending may proceed according to any suitable process.

For example, for solid ink jet oils, a polydisperse oil (diluent) comprising less than about 0.15% by weight VOCs having a molecular weight less than about 550 g/mol may be blended with a functionalized polydisperse oil to produce a blend including less than about 0.15% by weight VOCs having a molecular weight less than about 550 g/mol. Alternatively, in embodiments, a polydisperse oil (diluent) including more than about 0.15% by weight VOCs having a molecular weight less than about 550 g/mol may be blended with a functionalized polydisperse oil to produce a blend including more than 0.15% by weight VOCs. Such blended compositions comprising VOCs may then be subjected to the precision stripping processes of the present disclosure to selectively strip the most volatile components of the oil (for example, those components having a molecular weight of less than about 550 g/mol), reducing the content of those most volatile components of the oil without significantly increasing the oil viscosity. After being subjected to the stripping processes of the present disclosure, such blends may have the VOC content reduced such that the blends include no more than about 0.1% by weight VOCs having a molecular weight less than about 550 g/mol, or no more than about 0.001% by weight VOCs having a molecular weight less than about 550 g/mol.

In embodiments, the polydisperse oil (diluent) may have a viscosity less than about 30 cSt, such as from about 10 cSt to about 20 cSt, and the functionalized polydisperse oil may have a viscosity in the range of from about 200 cSt to about 1200 cSt, such as from about 400 cSt to about 800 cSt. The polydisperse oil (diluent) and the functionalized polydisperse oil are present in the blend in relative amounts in an effective ratio to achieve a desired viscosity. For example, in embodiments, the polydisperse oil component may account for about 80-95% of the blend, and the functionalized polydisperse oil component may account for about 5-20% of the blend. The resulting blend of the polydisperse oil (diluent) and the functionalized polydisperse oil may have a viscosity of less than about 40 cSt, such as from about 10 to about 30 cSt, or from about 15 cSt to about 28 cSt.

Figure 1:
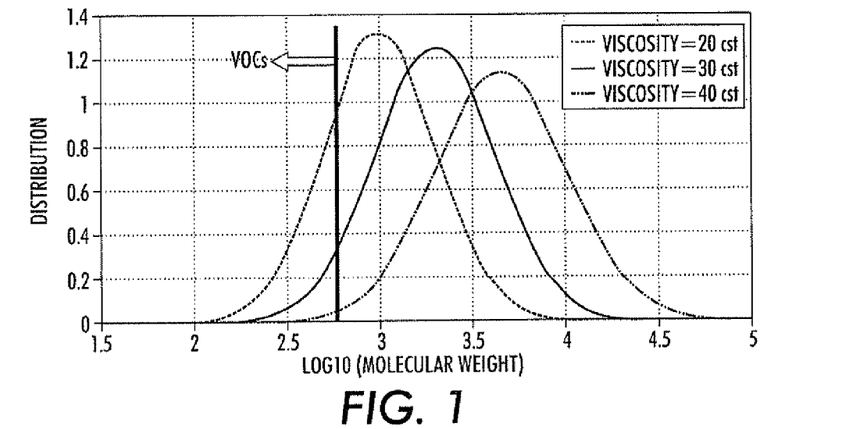
FIG. 1 is a graphical representation of the impact of oil viscosity on molecular weight distributions and VOC emissions.
Figure 8:
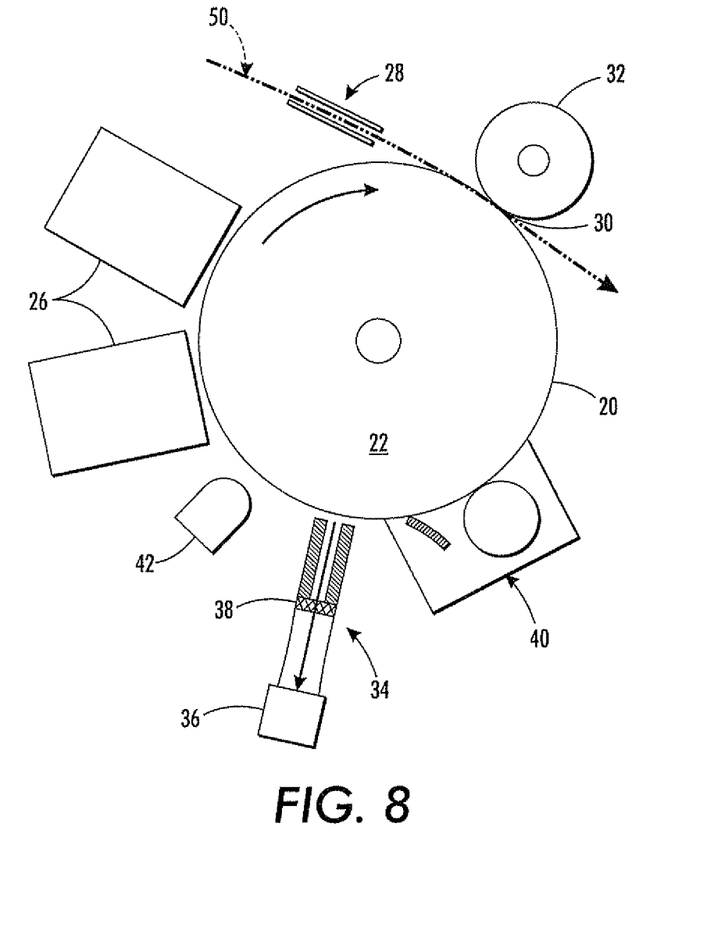
FIG. 8 is an illustration of a print process incorporating a release oil.

In embodiments, a viscosity of less than 30 cSt may allow for high transfer efficiency and excellent print quality in the solid ink transfix print process shown in FIG. 8. Viscosity is strongly dependent on the mean molecular weight of the oil. FIG. 1 is a graphical representation of the molecular weight distribution for oils of varying viscosities, illustrating the relative fraction of VOCs. Higher viscosity oils comprise fewer VOCs having a molecular weight less than about 550 g/mol, and increasing oil viscosity until the low molecular weight fraction becomes negligible may reduce VOC emissions. However, while compositions featuring increased oil viscosity may produce lower VOC emissions, high viscosity oils—having a viscosity above, for example, about 30 cSt—yield objectionable print quality defects, including poor transfer efficiency to the second side of the printing media during duplex printing in the solid ink transfix print process.

In embodiments, the blend of the polydisperse oil (diluent) and the functionalized polydisperse oil has a molecular weight in the range of from about 1000 g/mol to about 4000 g/mol, such as from about 1500 to about 2500, or from 1700 to about 2400 g/mol, or from about 1800 to about 2300 g/mol. The blend of the polydisperse oil (diluent) and the functionalized polydisperse oil may have a polydispersity index ($M_w/M_n$) in the range of from about 1.1 to about 4, such as from about 1.5 to about 2.4.

Figure 2:
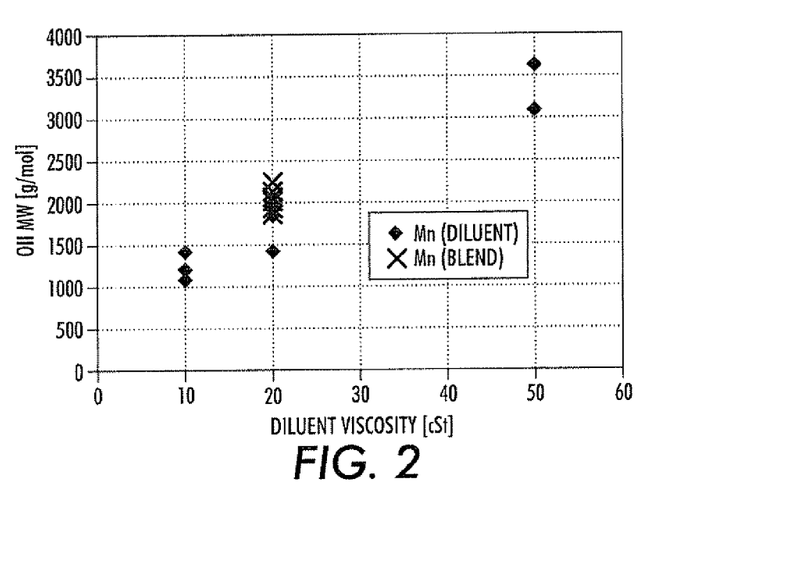
FIG. 2 is a graphical representation of the number average molecular weight ($M_n$) distribution of the polydisperse oil (diluent) and a polydisperse oil (diluent)/functionalized polydisperse oil blend as a function of diluent viscosity.
Figure 3:
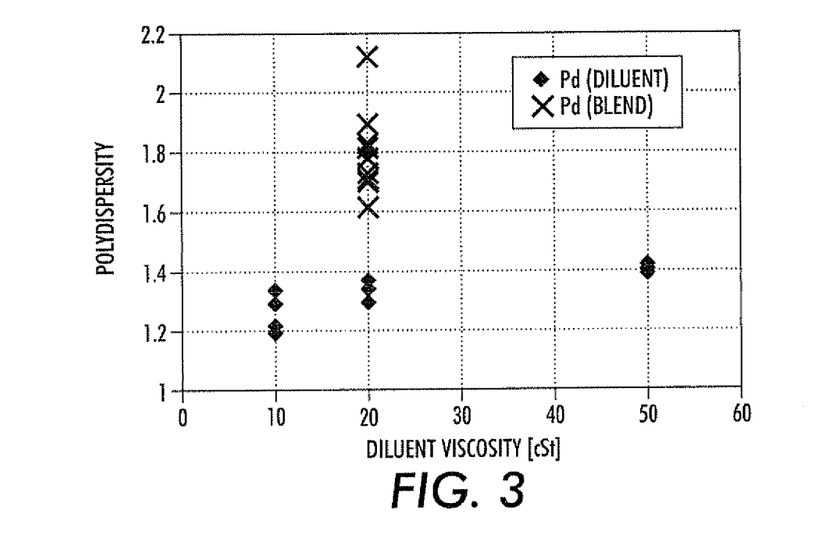
FIG. 3 is a graphical representation of the polydispersity index ($M_w/M_n$) of the polydisperse oil (diluent) and the blend as a function of diluent viscosity.

FIG. 2 presents a graphical representation of the number average molecular weight ($M_n$) distribution of the polydisperse oil (diluent) and the blend as a function of diluent viscosity. FIG. 3 presents a graphical representation of the polydispersity index ($M_w/M_n$) of the polydisperse oil (diluent) and the blend as a function of diluent viscosity.

Polydisperse Oil Composition (Fuser Oils)

In embodiments (such as for fuser oils), the polydisperse polymer or composition may comprise one or more polydisperse oils, such as a first, second, third, and/or fourth polydisperse oil, each having a viscosity of from about 75 cSt to about 1500 cSt, such as from about 100 cSt to about 1000 cSt, or from about 150 cSt to about 700 cSt. In embodiments, the polydisperse oil may include less than about 0.15% by weight VOCs, such as less than about 0.1% by weight VOCs, or less than about 0.01% by weight VOCs, or less than about 0.001% by weight VOCs, having a molecular weight less than about 2000 g/mol, such as less than about 1500 g/mol, or less than about 1000 g/mol, or less than about 800 g/mol.

In some high viscosity embodiments (such as for oils in which the viscosity is in the range of from about 700 cSt to about 1500 cSt, such as from about 1000 cSt to about 1300 cSt), the upper end of the molecular weight distribution may remain the same before and after methods of the present disclosure are used to remove the low molecular weight fraction and may be in the range of from about 20,000 g/mol to about 100,000 g/mol, such as an upper end of the molecular weight distribution in the range of from about 30,000 g/mol to about 60,000 g/mol, or an upper end of the molecular weight distribution in the range of from about 40,000 g/mol to about 50,000 g/mol.

In embodiments, the polydisperse oil may be a blended oil comprising a first polydisperse oil (diluent) and a functionalized polydisperse oil. The polydisperse oil component of the blend for a fuser oil may comprise one or more polydisperse oils, such as a first, second, third, and/or fourth polydisperse oil, each having a viscosity of from about 100 cSt to about 190 cSt, such as from about 125 cSt to about 180 cSt, or from about 150 to about 175 cSt. The functionalized polydisperse oil component of the blend may have a viscosity higher than that of the first polydisperse components in the blend. For example, the functionalized polydisperse oil may have a viscosity in the range of from about 200 cSt to about 1200 cSt, such as in the range of from about 400 cSt to about 1000 cSt, or in the range of from about 500 cSt to about 800 cSt.

In embodiments, the polydisperse oil blend may be a toner release composition that may include less than about 0.15% by weight VOCs, such as less than about 0.1% by weight VOCs, or less than about 0.01% by weight VOCs, or less than about 0.001% by weight VOCs, having a molecular weight less than about 2000 g/mol, such as less than about 1500 g/mol, or less than about 1000 g/mol, or less than about 800 g/mol. In embodiments, each of the polydisperse components of the blend includes less than about 0.15% by weight VOCs, such as less than about 0.1% by weight VOCs, or less than about 0.01% by weight VOCs, or less than about 0.001% by weight VOCs, having a molecular weight less than about 2000 g/mol, such as less than about 1500 g/mol, or less than about 1000 g/mol, or less than about 800 g/mol.

In embodiments, the polydisperse oil blend may have a content of VOCs having a molecular weight less than 2000 g/mol, such as less than about 1500 g/mol, or less than about 1000 g/mol, or less than about 800 g/mol, that is at least 10 times less than that of the polydisperse oil or the functionalized polydisperse oil prior to stripping, such as about 15 times less, or about 50 times less, or about 70 times less, or about 80 times less.

In embodiments, the polydisperse oil blend, which may be a toner release oil composition, comprises a functionalized polydisperse oil having a viscosity in the range of from about 200 cSt to about 1200 cSt, such that the blend has a viscosity less than about 75 cSt to about 1500 cSt, such as from about 100 cSt to about 1000 cSt, or from about 150 cSt to about 700 cSt, and includes less than about 0.15% by weight VOCs, such as less than about 0.1% by weight VOCs, or less than about 0.01% by weight VOCs, or less than about 0.001% by weight VOCs, having a molecular weight less than about 2000 g/mol, such as less than about 1500 g/mol, or less than about 1000 g/mol, or less than about 800 g/mol.

The distribution of the molecular weights of the first polydisperse oil when plotted against the population of individual molecules having the respective molecular weight may be a wide or narrow distribution where the difference between the molecular weight at the lower end of the distribution and the upper end of the distribution is in the range of from about 500 g/mol to about 5000 g/mol, such as where the difference between the molecular weight at the lower end of the distribution and the upper end of the distribution is in the range of from about 800 g/mol to about 3500 g/mol.

In embodiments, before the methods of the present disclosure are used to remove the low molecular weight fraction, the weight percentage of VOCs having a molecular weight at the lower end of the distribution in the range of from about 30 g/mol to about 2500 g/mol, such as in the range of from about 400 g/mol to about 2000 g/mol, or in the range of from about 600 g/mol to about 1500 g/mol may be from about 0.01% to about 3%, such as from about 0.015% to about 1%. Before the methods of the present disclosure are used to remove the low molecular weight fraction (including VOCs having a molecular weight less than about 2000 g/mol, such as less than about 1500 g/mol, or less than about 1000 g/mol, or less than about 800 g/mol), the logarithm of the molecular weight distribution of the first polydisperse oil may be substantially Gaussian.

In embodiments, after the methods of the present disclosure are used to remove the low molecular weight fraction, substantially all of the VOCs, such as at least 90% by weight (relative to the initial weight amount of VOCs that were present), or at least 98% by weight, or at least 99.9% by weight of the VOCs having a molecular weight less than about 2000 g/mol, such as less than about 1500 g/mol, or less than about 1000 g/mol, or less than about 800 g/mol, have been removed. After the aforementioned VOCs are removed, the lowest substantially populated molecular weight (such as greater than 0.001% abundance, or greater than 0.02% abundance relative to the population of the entire molecular weight distribution) at the lower end of the distribution may be in the range of from about 600 g/mol to about 3500 g/mol, such as in the range of from about 650 g/mol to about 2000 g/mol, or in the range of from about 800 g/mol to about 1500 g/mol. After the methods of the present disclosure are used to remove the low molecular weight fraction, a plot of the distribution of the first polydisperse oil departs from a substantially Gaussian distribution because of the removal of the lower molecular weight molecules of the distribution.

In embodiments, the viscosity of the polydisperse oil blend, which may be a toner release oil composition, before the methods of the present disclosure are used to remove the low molecular weight fraction is within about 4%, such as within a viscosity of about 1%, or a viscosity of within about 0.1%, of the viscosity of the polydisperse oil blend after the methods of the present disclosure have been used to remove the low molecular weight fraction (including VOCs having a molecular weight less than about 2000 g/mol, such as less than about 1500 g/mol, or less than about 1000 g/mol, or less than about 800 g/mol).

In embodiments, a polydisperse oil of this disclosure may be an unsubstituted organopolysiloxane such as, for example, polydimethylsiloxane (PDMS), diphenylpolysiloxane, or phenylmethylsiloxane.

In embodiments, the polydisperse oil may have a polydispersity index ($M_w/M_n$) in any desired ranges, such as in the range of from about 1.05 to about 4, such as in the range of from about 1.1 to about 3, or from about 1.1 to about 2.4, or in the range of from about 1.2 to about 2.

The functionalized polydisperse oil may have functional groups pendant from at least some of the polymer molecules therein. The functional groups may be, for example, carboxy, hydroxyl, epoxy, amino, isocyanate, thioether, mercapto, carbinol, methacryl, phenol, and the like.

The molecular weight of the functionalized polydisperse oil should be sufficient to achieve a high viscosity functionalized polydisperse oil (relative to the viscosity of the polydisperse oil diluent). In this regard, the molecular weight of the functionalized polydisperse oil to be used in the compositions of the present disclosure may ultimately depend on how the polymer is functionalized and the specific identity of the functional groups that are present on the polymer chains. In embodiments, the average molecular weight (and optionally the polydisperity index) of the functionalized polydisperse oil may be selected such that the functionalized polydisperse oil possesses a viscosity in the range of from about 200 cSt to about 1200 cSt. For example, the average molecular weight (and optionally the polydispersity index) of the functionalized polydisperse oil may be in a range that is sufficient to achieve a viscosity in the range of from about 200 cSt to about 1200 cSt, such as a number average molecular weight that is sufficient to achieve a viscosity in the range of from about 200 cSt to about 1200 cSt, or a viscosity in the range of from about 400 cSt to about 1000 cSt, or a viscosity in the range of from about 500 cSt to about 800 cSt. In embodiments, such a functionalized polydisperse oil with the above-mentioned viscosities may have any desired polydispersity index ($M_w/M_n$), such as a polydispersity index of from about 1.1 to about 6, such as about 1.2 to about 4.

In embodiments, the functionalized polydisperse oil may be prepared by any suitable method, such as by reacting amino-functionalized polydimethylsilxoanes.

Polydisperse Oil/Functionalized Polydisperse Oil Blend (Fuser Oils)

In embodiments, a polydisperse oil (diluent) and a functionalized polydisperse oil are combined to produce a fuser oil blend. Blending may proceed according to any suitable process.

For example, a polydisperse oil (diluent) comprising less than about 0.15% by weight VOCs having a molecular weight less than about 2000 g/mol may be blended with a functionalized polydisperse oil to produce a blend including less than about 0.15% by weight VOCs having a molecular weight less than about 2000 g/mol. Alternatively, in embodiments, a polydisperse oil (diluent) including more than about 0.15% by weight VOCs having a molecular weight less than about 2000 g/mol may be blended with a functionalized polydisperse oil to produce a blend including more than 0.15% by weight VOCs having a molecular weight less than about 2000 g/mol. Such blended compositions comprising VOCs may then be subjected to the precision stripping processes of the present disclosure to selectively strip the most volatile components of the oil (for example, those components having a molecular weight of less than about 2000 g/mol), reducing the content of those most volatile components of the oil without significantly increasing the oil viscosity. After being subjected to the stripping processes of the present disclosure, such blends may have the VOC content reduced such that the blends include no more than about 0.1% by weight VOCs having a molecular weight less than about 2000 g/mol, or no more than about 0.001% by weight VOCs having a molecular weight less than about 2000 g/mol.

In embodiments, the polydisperse oil (diluent) may have a viscosity of from about 100 cSt to about 190 cSt, such as from about 125 cSt to about 180 cSt, or from about 150 to about 175 cSt, and the functionalized polydisperse oil may have a viscosity in the range of from about 200 cSt to about 1200 cSt, such as from about 400 cSt to about 800 cSt. The polydisperse oil (diluent) and the functionalized polydisperse oil are present in the blend in relative amounts in an effective ratio to achieve a desired viscosity. For example, in embodiments, the polydisperse oil (diluent) component may account for about 70-95% of the blend, and the functionalized polydisperse oil component may account for about 5-30% of the blend. The resulting blend of the polydisperse oil (diluent) and the functionalized polydisperse oil may have a viscosity of from about 75 cSt to about 1500 cSt, such as from about 100 cSt to about 1000 cSt, or from about 150 cSt to about 700 cSt.

Volatile Organic Compounds (VOCs)

In embodiments, the methods of the present disclosure may be used to reduce the VOC content of polydisperse oil compositions by at least 50% or reduce the VOC content by orders of magnitude (such as by a factor or 10 or 100) to arrive at polydisperse oil compositions that include less than about 0.15% by weight VOCs, such as less than about 0.1% by weight VOCs, or less than about 0.01% by weight VOCs, or less than about 0.001% by weight VOCs.

Before being stripped according to the methods described herein, a polydisperse oil may emit VOCs in a concentration of greater than about 1.5 PPM (methanol equivalent), such as greater than about 5 PPM, or greater than about 10 PPM, as measured using a Flame Ionization Detector (FID). In embodiments, when the polymer compositions of the present disclosure are heated to a predetermined temperature, VOCs are emitted in a concentration of less than about 0.5 PPM (methanol equivalent), such as less than about 0.1 PPM, or less than about 0.08 PPM, or less than about 0.01 PPM, or less than about 0.001 PPM, as measured using FID.

The threshold for volatility increases as temperature increases. Accordingly, in embodiments, such as for solid ink jet oils, the compositions include less than about 0.15% by weight VOCs, such as less than about 0.1% by weight VOCs, or less than about 0.01% by weight VOCs, or less than about 0.001% by weight VOCs, having a molecular weight less than about 700 g/mol, such as less than about 550 g/mol, or less than about 450 g/mol. In embodiments, the composition is substantially free of VOCs having a molecular weight less than about 700 g/mol, such as less than about 550 g/mol, or less than about 450 g/mol. The phrase "substantially free" refers, for example, to a polydisperse oil composition in which the concentration of VOCs approaches zero, such as a concentration of less than about 0.15% by weight, or less than about 0.1% by weight, or less than about 0.01% by weight, or less than about 0.001% by weight.

In embodiments, such as for fuser oils, the compositions include less than about 0.15% by weight VOCs, such as less than about 0.1% by weight VOCs, or less than about 0.01% by weight VOCs, or less than about 0.001% by weight VOCs, having a molecular weight less than about 2000 g/mol, or less than about 1500 g/mol, or less than about 1000 g/mol, or less than about 800 g/mol. In embodiments, the composition is substantially free of VOCs having a molecular weight less than about 2000 g/mol, or less than about 1500 g/mol, or less than about 1000 g/mol, or less than about 800 g/mol.

As discussed above, VOCs are dominated by low molecular weight components. For example, in embodiments in which the polydisperse oil is a polydimethylsiloxane, VOCs are primarily siloxanes. Table 1 illustrates properties of selected high volatility components of PDMS oil.

TABLE 1

Selected Cyclic and Linear Organiosiloxane Properties

| Name | Formula | MW | Vapor Pressure mmHg 77° F. | Abbreviations | Boiling Point ° F. | Water Solubility (mg/L) 25° C. |
|---|---|---|---|---|---|---|
| Hexamethylcyclotrisiloxane | $C_6H_{18}O_3Si_3$ | 222 | 10 | $D_3$ | 275 | 1.56 |
| Octamethylcyclotetrasiloxane | $C_8H_{24}O_4Si_4$ | 297 | 1.3 | $D_4$ | 348 | 0.056 |

TABLE 1-continued

Selected Cyclic and Linear Organiosiloxane Properties

| Name | Formula | MW | Vapor Pressure mmHg 77° F. | Abbreviations | Boiling Point ° F. | Water Solubility (mg/L) 25° C. |
|---|---|---|---|---|---|---|
| Decamethylcyclopentasiloxane | $C_{10}H_{30}O_5Si_5$ | 371 | 0.4 | $D_5$ | 412 | 0.017 |
| Dodecamethylcyclohexasiloxane | $C_{12}H_{36}O_6Si_6$ | 445 | 0.02 | $D_6$ | 473 | 0.005 |
| Hexamethyldisiloxane | $C_6H_{18}Si_2O$ | 162 | 31 | $L_2$, MM | 224 | 0.93 |
| Octamethyltrisiloxane | $C_8H_{24}Si_3O_2$ | 236 | 3.9 | $L_3$, MDM | — | 0.035 |
| Decamethyltetrasiloxane | $C_{10}H_{30}Si_4O_3$ | 310 | 0.55 | $L_4$, $MD_2M$ | — | — |
| Dodecamethylpentasiloxane | $C_{12}H_{36}Si_5O_4$ | 384 | 0.7 | $L_5$, $MD_3M$ | — | — |

Figure 4:
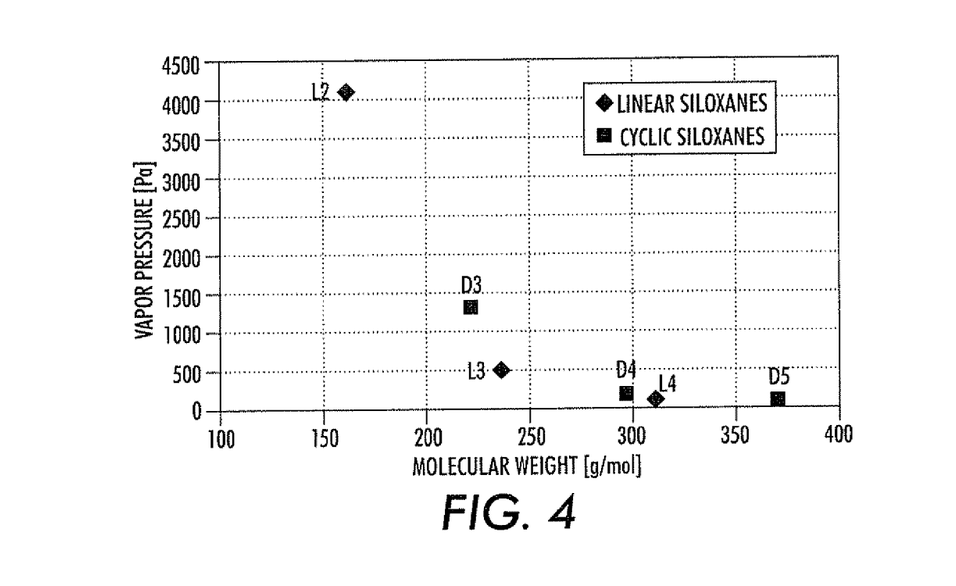
FIG. 4 is a graphical representation of siloxane volatility as a function of molecular weight.

For example, in embodiments wherein the polydisperse oil is a polydimethylsiloxane, the volatile organic compounds having a molecular weight of less than about 550 g/mol include hexamethylcyclotrisiloxane, octamethylcyclotetrasiloxane, decamethylcyclopentasiloxane, dodecamethylcyclohexasiloxane, hexamethyldisiloxane, octamethyltrisiloxane, decamethyltetrasiloxane, and dodecamethylpentasiloxane. FIG. 4 provides a graphical representation of siloxane volatility as a function of molecular weight. In embodiments, the most volatile components of the oil are those having the lowest molecular weight.

In embodiments in which the polydisperse oil is a polydimethylsiloxane, cyclic siloxanes (i.e., hexamethylcyclotrisiloxane, octamethylcyclotetrasiloxane, decamethylcyclopentasiloxane, and dodecamethylcyclohexasiloxane) generally make a greater contribution to the overall VOCs than linear siloxanes (i.e., hexamethyldisiloxane, octamethyltrisiloxane, decamethyltetrasiloxane, and dodecamethylpentasiloxane). In other words, cyclic siloxanes may make a greater contribution to the VOCs than the linear siloxanes of similar molecular weight.

Preparing a Polydisperse Oil Having a Low Content of VOCs

The methods of the present disclosure include preparing a polydisperse oil having a low content of VOCs by removing the low molecular weight (most volatile) components without substantially increasing the viscosity. Prior to stripping, a significant fraction of the molecules in the polydisperse oil may have molecular weights below the threshold for volatility (such as less than 550 g/mol, however this value will depend of the molecular makeup of the polydisperse oil, or the operating temperature of the oil). Unlike conventional techniques, the stripping processes of the present disclosure do not remove a large fraction of molecules with molecular weights both above and below the threshold for volatility. Thus, the mean molecular weight of the final distribution of molecules in the stripped oil does not substantially increase and the viscosity of the polydisperse oil does not significantly change.

Figure 5:
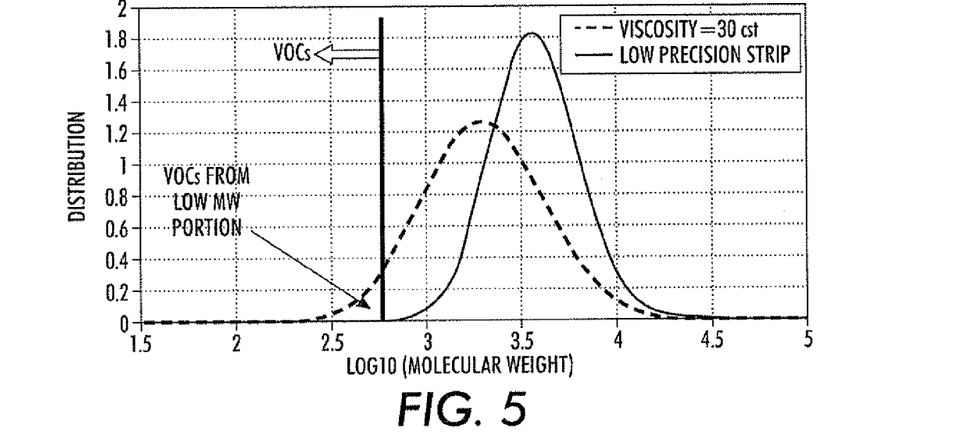
FIG. 5 is a graphical representation of the effect of aggressive, low-precision stripping methods on oil molecular weight distribution.

FIG. 5 provides a graphical representation of the effect of low precision stripping of low molecular weight components on the oil molecular weight distribution. Before stripping, a significant fraction of the molecules in the oil have molecular weights below the threshold for volatility (for this exemplary composition, less than about 550 g/mol). Stripping by an aggressive, low-precision stripping process removes a large fraction of molecules with molecular weights both above and below the threshold for volatility. Consequently, the mean molecular weight of the final distribution of molecules in the stripped oil substantially increases, which increases the viscosity of the oil (see, for example, FIG. 1). Although the volatile components of the oil are successfully stripped, the viscosity increases to such a degree that it is unfit for use in the printing process.

Figure 6:
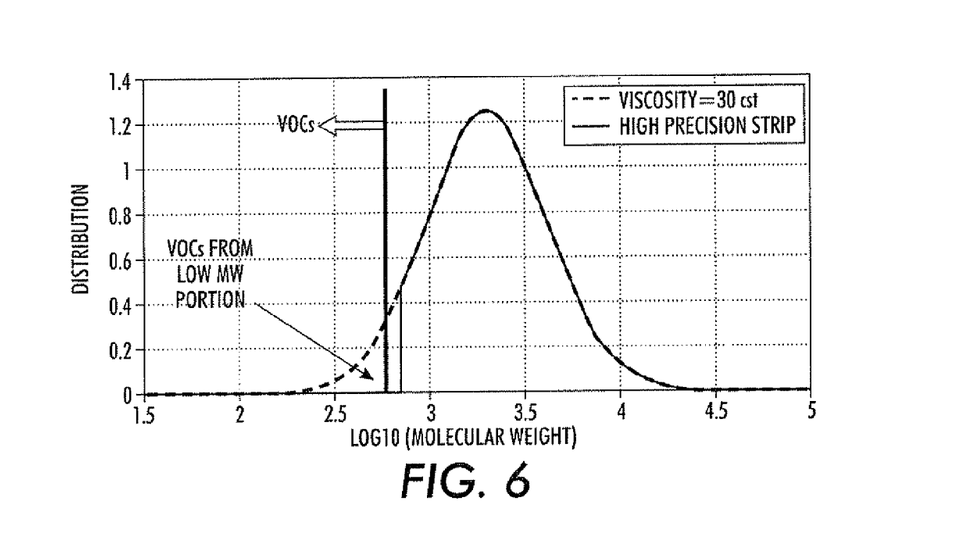
FIG. 6 is a graphical illustration of the molecular weight distribution following a high precision stripping of low molecular weight components.

According to the methods of the present disclosure, the volatile components of the polydisperse oil having a molecular weight below the threshold for volatility, such as, for example, a molecular weight less than about 550 g/mol, may be selectively removed without significantly increasing the viscosity of the oil. FIG. 6 is a hypothetical graphical representation of the effect of the high precision stripping process of the current disclosure on oil and exemplary hypothetical molecular weight distribution. In embodiments, the process of the present disclosure may be utilized to strip only the very low molecular weight fraction of the oil that contributes to VOC emissions, leaving the molecules with molecular weights above the threshold for volatility (for the purposes of this illustration, the molecules having a molecular weight greater than about 550 g/mol). As a result, there is no significant shift in the viscosity because the mean molecular weight of the oil remains nearly unchanged. For example, the viscosity of the stripped polydisperse oil may be within about 2% of the viscosity of the initial unstripped polydisperse oil, such as within about 1% of the viscosity of the initial unstripped polydisperse oil. Accordingly, the stripped oil would exhibit both low viscosity and low VOC emissions because the low molecular weight components have been stripped from the oil, while the higher molecular weight components have been retained.

In embodiments, the method according to the present disclosure includes the steps of flowing polydisperse oil comprising VOCs over a surface to form a layer of polydisperse oil, and then heating the layer of polydisperse oil at an effective temperature to remove VOCs, and forming a stripped polydisperse oil substantially free of VOCs.

In embodiments, the VOCs have a vapor pressure in the range of from about 0.07 mmHg to about 10 mm Hg at 25° C., such as 0.2 mmHg to about 5.0 mm Hg at 25° C.

In embodiments, the methods of the present disclosure result in a product polydisperse oil in which the viscosity of the stripped polydisperse oil is within about 2% of the viscosity of the initial (unstripped) oil, and the mass of the stripped polydisperse oil is within about 1% of the mass of the initial oil.

Examples of the polydisperse oil include, for example, non-functional polydisperse oils such as silicone oils, including polydimethylsiloxane (PDMS), or functionalized polydisperse oils, such as amino-substituted oils, mercapto-substituted oils, hydride-substituted oils, or the like, and blends thereof.

In embodiments, the methods of the present disclosure may be employed with a polydisperse oil in which the polydisperse oil has a number average molecular weight in the range of from about 800 g/mol to about 3500 g/mol, and a polydispersity index ($M_w/M_n$) in the range of from about 1.1 to about 4.0, such as from about 1.1 to about 3.2.

The methods of the present disclosure may be effectively employed on any desired polydisperse oil that comprises VOCs, such as VOCs having a molecular weight less than about 550 g/mol. For example, when the polydisperse oil comprises PDMS, the VOCs may include linear siloxanes and cyclic siloxanes having a molecular weight less than about 550 g/mol. In such embodiments where the polydisperse oil comprises PDMS, the methods of the present disclosure may be performed on an unstripped polydisperse oil comprising linear siloxanes and cyclic siloxanes having a molecular weight less than about 550 g/mol, and the stripped polydisperse oil may contain an amount of linear siloxanes and cyclic siloxanes having a molecular weight less than about 550 g/mol that is at least 20 times lower than that of the initial (unstripped) polydisperse oil. The cyclic siloxanes having a molecular weight less than about 550 g/mol may be, for example, hexamethylcyclotrisiloxane, octamethylcyclotetrasiloxane, decamethylcyclopentasiloxane, dodecamethylcyclohexasiloxane, and combinations thereof. The linear siloxanes having a molecular weight less than about 550 g/mol may be, for example, hexamethyldisiloxane, octamethyltrisiloxane, decamethyltrisiloxane, dodecamethylpentasiloxane, and combinations thereof.

In such embodiments where the polydisperse oil comprises PDMS, the methods of the present disclosure may be performed on an unstripped polydisperse oil comprising linear siloxanes and cyclic siloxanes having a molecular weight less than about 550 g/mol, and the stripped polydisperse oil may contain an amount of linear siloxanes and/or cyclic siloxanes having a molecular weight less than about 550 g/mol that is at least 20 times lower than that of the polydisperse oil.

In embodiments wherein the polydisperse oil is PDMS, VOCs from the initial (unstripped) oil are dominated by siloxanes. In embodiments, low molecular weight siloxanes (for example, hexamethyldisiloxane, hexamethylcyclotrisiloxane) are more volatile, but there are fewer of these low molecular weight siloxanes in the unstripped polydisperse oil. In embodiments, cyclic siloxanes (i.e., hexamethylcyclotrisiloxane, octamethylcyclotetrasiloxane, decamethylcyclopentasiloxane, dodecamethylcyclohexasiloxane) make greater contributions to the amount of VOCs than linear siloxanes (i.e., hexamethyldisiloxane, octamethyltrisiloxane, decamethyltrisiloxane, dodecamethylpentasiloxane).

VOCs may be removed by flowing the initial polydisperse oil over a surface and heating it at a temperature effective to remove the VOCs. The oil may be flowed over a surface in a thin layer to achieve a high surface area to volume ratio. A thinner layer yields a higher surface area to volume ratio, which leads to a faster and more complete evaporation of the high volatility components of the oil. In embodiments, the surface area to volume ratio is in the range of from about 1 $cm^{-1}$ to about 20 $cm^{-1}$.

The oil may be flowed over the surface at a controlled rate ($R_{OIL}$) in mL/min. In embodiments, this rate is from about $[0.04*L_0]$ to about $[10*L_0]$, where $L_0$ is the width (in cm) of the surface over which the oil flows.

Figure 7:
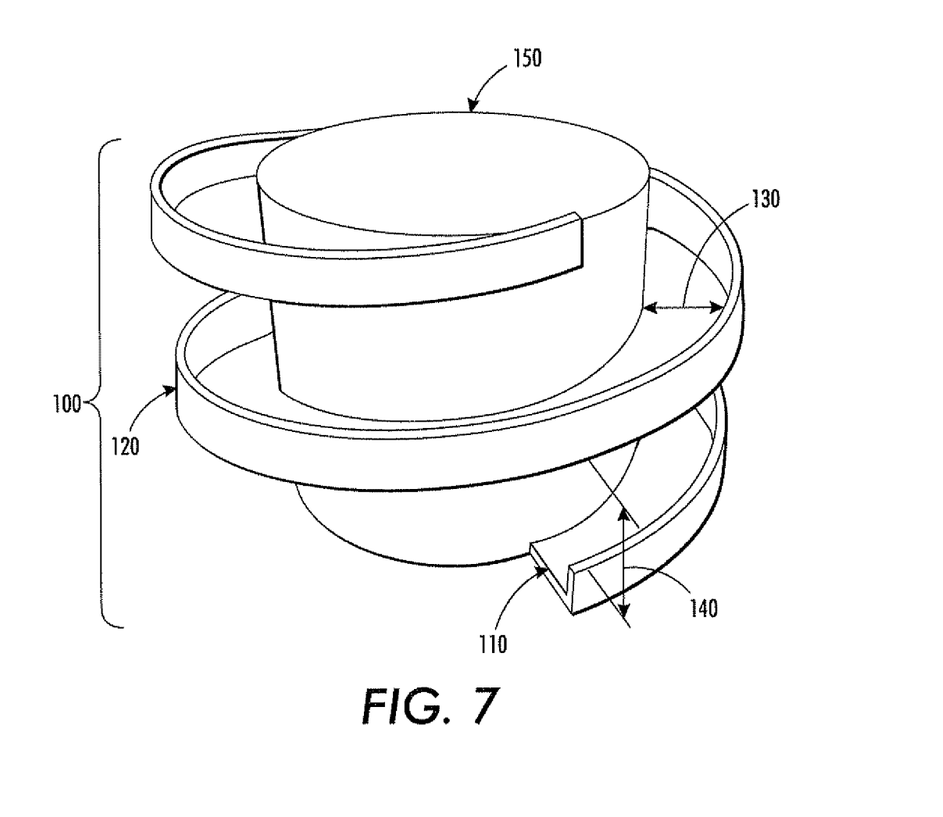
FIG. 7 is an illustration of one exemplary helical ramp over which a polydisperse oil may be flowed to remove VOCs.

FIG. 7 illustrates one exemplary embodiment of a helical ramp 100 over which oil may be flowed in order to strip the oil of VOCs. In embodiments, the width of the ramp 130 ($L_0$) and the height of the edge 120 may be set to any desired distance to accommodate the volume of oil to be stripped at the desired rate. In embodiments, the oil may flow over the ramp under the force of gravity. The slope of the ramp (or the distance between successive vertical points on the ramp 140) may be adjusted to any suitable value. For example, for more viscous oils, the slope (or the distance between successive layers 140) may be increased to level sufficient to allow the oil to flow at a given rate such that the oil spends a predetermined amount of time on the ramp. A longer ramp length allows for a more complete stripping of VOCs at the end of the process. To save space, a helical ramp may be used. In embodiments, the ramp 100 may contain a center rod-like structure 150, around which the flowing surface proceeds in a helical fashion, and the stripped oil may be collected at the bottom 110 of the ramp.

To increase the evaporation rate, the surface over which the oil is flowed may be heated. The temperature ($T_{OIL}$) contributes to the range of molecular weights that are removed from the oil, with higher $T_{OIL}$ temperatures removing higher molecular weight components. In embodiments, the polydisperse oil is a fuser oil or a solid ink oil. In general, the stripping temperature $T_{OIL}$ will be greater than the print process temperature ($T_{PROCESS}$). For example, in embodiments, the polydisperse oil may be a solid ink oil, and $T_{OIL}$ may range from about 50° C. to about 80° C. Alternatively, the polydisperse oil may be a fuser oil, and $T_{OIL}$ may range from about 150° C. to about 250° C. In embodiments, the ramp may be heated to a uniform temperature. In embodiments, portions of the ramp may be set to different temperature profiles to form a temperature gradient.

In embodiments, to increase the evaporation rate, gas may be flowed over the surface at a controlled flow rate. A faster flow rate yields a higher evaporation rate. Alternatively, to increase the evaporation rate, the oil surface may also be exposed to a vacuum. The pressure of the partial vacuum (P) may be controlled.

According to the method of the present disclosure, an oil composition yielding low VOC emissions may be produced without chemically altering or degrading the oil. For example, the color of the stripped polydisperse oil may be substantially similar to that of the initial oil. In embodiments, for example, the color of the stripped polydisperse oil may be identical to the color of the initial (unstripped) oil.

Print System

In embodiments, the oil composition described herein may be applied to the surface of a fusing/transfer member in a printer system for use in printing applications.

The terms "printer" or "imaging device" refer, for example, to a device for applying an image to print media. Such device may encompass any apparatus, such as a digital copier, book-making machine, facsimile machine, multi-function machine, and so forth, which performs a print outputting function for any purpose.

Referring to FIG. 8, in a typical solid ink jet printer system for use in printing applications, a thin film of oil is applied to the surface 20 of a transfer member, such as a rotating metallic drum 22. The transfer member described herein can be of any suitable configuration. Examples of suitable configurations include a sheet, a film, a web, a foil, a strip, a coil, a cylinder, a drum, and endless Mobius strip, a circular disc, a belt (including an endless belt, an endless seamed flexible belt, an endless seamless flexible belt, and an endless belt having a puzzle cut seam) and the like. In embodiments, the transfer member is a metallic drum, such as an aluminum drum.

Further in reference to FIG. 8, the oil may be applied to the surface 20 of the rotating metallic drum 22 with a Drum Maintenance Unit (DMU) 40. In solid ink imaging systems, the DMU is configured to (1) lubricate the image receiving surface of the drum with a very thin, uniform layer of the release agent before each print cycle, and (2) remove and store any excess oil, ink, and debris from the surface of the drum after each print cycle. DMUs may include a reservoir for holding a release agent, an applicator that receives oil from the reservoir and applies oil to the surface of the drum, and a metering blade for metering the oil applied to the surface of the drum by the applicator. The printer system may also contain an image on drum (IOD) or image on web array (IOWA) sensor 42 to allow a device to measure the various defects or variations (for example, clogged ink jets and/or misalignment of ink jets and/or print heads). An IOD or IOWA sensor 42 may be an image sensor configured to monitor, for example, the presence, intensity, and/or location of marking material jetted onto a substrate by the ink jets of the print heads 26. An IOD or IOWA sensor could generally include, for example, a light source and/or more optical detectors situated to detect marking material on a substrate.

Print heads 26 jet ink onto the oiled surface 20 of the drum 22. It may be necessary for the drum 22 to rotate multiple times to build the image on the drum surface 20. In a solid ink printer system, the ink, which is solid at room temperature, is heated (for example, to about 115° C.) and converted to a liquid in the print heads 26. The temperature of the oiled drum surface 20 is lower than that of the liquid ink (for example, about 55° C.), and the ink cools into a malleable solid shortly after contacting the drum surface 20. Once the image is built on the drum surface 20, a media is transported along the media path 50 through a pre-heater 28 and enters the transfix nip 30, where the ink is transferred to the media. The transfix roller 32, which in embodiments comprises a conformable elastomer on a metal shaft, is brought into contact with the backside of the media, forming the high pressure nip 30, which ensures the paper makes secure contact with the ink on the oiled drum surface 20. The oil acts as a release layer and reduces the adhesive force of the ink to the drum surface 20, which aids in the transfer efficiency of the ink from the oiled drum surface 20 to the media. In order to achieve high transfer efficiency and excellent print quality, the adhesive force between the media and the ink should be greater than the adhesive force between the ink and the oiled drum surface 20. Without the oil, the drum-ink adhesion is too high, resulting in poor transfer efficiency and poor print quality.

The terms "media" and "print media" may refer to any suitable physical print media substrate for images. For example, potentially suitable media may include paper, substrate, transparency material such as polyester, polycarbonate, and the like, cloth, wood, and any other desired material upon which the finished image will be situated. An image generally may include information in electronic form which is to be rendered on the print media by the image forming device and may include text, graphics, pictures, and so forth.

Further in reference to FIG. 8, the abatement system 34, optionally containing a VOC filter 38, pulls air, dust, particles, and volatile chemicals out of the printer cavity and into the environment with a fan 36. In embodiments, the exhausted materials may pass through the fan 36 after passing through the optional VOC filter 38, as illustrated in FIG. 8. In other embodiments, the exhausted materials may pass through the fan 36 before passing through the optional VOC filter 38. In other words, the optional VOC filter may be externally or internally incorporated into the abatement system 34.

In a system featuring the stripped oil, the VOCs emitted by the oil and exhausted into the environment through the abatement system 34 are reduced as compared to a system incorporating an initial (unstripped) oil. In embodiments, the VOC filter 38 may be optionally removed or eliminated from the system featuring the stripped oil, as the VOCs emitted by the stripped oil and exhausted into the environment may be reduced as compared to a system incorporating an unstripped oil, such as reduced to a level that satisfies government regulations and/or environmental certifications, without using the filter.

Examples are set forth below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Preparation of 30 cSt Silicone Oil

An oil composition was prepared by blending a polydisperse PDMS diluent having a viscosity of 20 cSt with amino-functionalized PDMS (amine concentrate) having a viscosity of 400-800 cSt. The diluent and amine concentrate were combined in a 95:5 ratio of diluent to amine concentrate. The resulting blend had a viscosity of 29.8 cSt.

Example 2

Sample demonstration of a selective, high precision process for eliminating volatile organic compounds from oil.

A shallow pool of the 30 cSt silicone oil as prepared in Example 1 above was placed in a large Erlenmeyer flask sitting on a hot plate. The ratio of the surface area to the volume was sufficiently large to ensure a rapid rate of evaporation. The oil was heated to a temperature of $T_{STRIP}=80°$ C. under an airflow of 18 ft$^3$/min for 80 minutes while monitoring VOC emissions.

Figure 9:
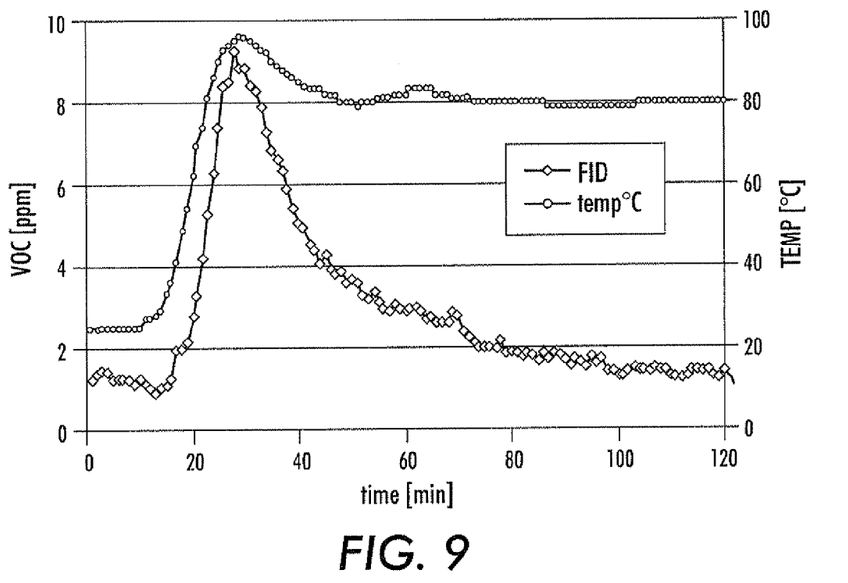
FIG. 9 is a graphical representation of the VOC emissions over time of a polydisperse oil composition during the selective, high precision VOC stripping process.

FIG. 9 presents a graphical representation of VOC emissions during the low temperature stripping process. VOC emissions increased initially as the oil was heated, and then dropped exponentially as the volatile components rapidly evaporated.

The VOC emissions between the initial and stripped oils were compared by dripping each oil at a rate of 23 mL/min onto a heated metal plate ($T_{PLATE}=60°$ C.) in a chamber with a controlled airflow (9.7 ft$^3$/min). The VOC emissions were measured in PPM (methanol equivalent) using a Flame Ionization Detector (FID).

The VOC emissions of the stripped oil were 0.07 PPM (methanol equivalent) as measured by FID, as compared to 5.5 PPM (methanol equivalent) for the untreated initial oil. As such, the VOC emissions of the stripped oil were over 80 times lower than the emissions from the untreated initial oil. Less than 0.15% of the total mass of the oil was stripped, indicating that the stripping was highly selective and removed only the most volatile (i.e., lowest molecular weight) components of the oil. A visual inspection of the oil showed that there was no discoloration of the oil. NMR analysis indicated that there was no chemical degradation of the oil.

The viscosity of the stripped oil was compared to the viscosity of the initial oil. The average viscosity of the stripped oil was 29.7 cSt, which is nearly identical to the average viscosity of 29.8 cSt measured for the initial oil.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of preparing a polydisperse oil having a low content of volatile organic compounds (VOCs), the method comprising:
   flowing polydisperse oil comprising VOCs over a surface to form a layer of polydisperse oil, and
   forming a stripped polydisperse oil substantially free of VOCs having a molecular weight less than about 1500 g/mol by heating the layer of polydisperse oil at an effective temperature to remove VOCs having a molecular weight less than about 1500 g/mol.

2. The method of claim 1, wherein the polydisperse oil has a number average molecular weight in the range of from about 800 g/mol to about 3500 g/mol, and a polydispersity index ($M_w/M_n$) in the range of from about 1.1 to about 2.2; and the layer of polydisperse oil is heated at an effective temperature to remove VOCs having a molecular weight less than about 550 g/mol to form a stripped polydisperse oil that includes less than about 0.15% by weight VOCs having a molecular weight less than about 550 g/mol.

3. The method of claim 2, wherein the VOCs have a vapor pressure in the range of from about 0.01 mmHg to about 40 mmHg at 25° C.

4. The method of claim 2, wherein the polydisperse oil has a viscosity in the range of from 10 cSt to about 40 cSt, and the viscosity of the stripped polydisperse oil is within about 2% of the viscosity of the polydisperse oil.

5. The method of claim 2, wherein the polydisperse oil is a solid ink oil and the effective temperature is in the range of from about 40° C. to about 120° C.

6. The method of claim 1, wherein the polydisperse oil is a fuser oil and the effective temperature is in the range of from about 140° C. to about 250° C.

7. The method of claim 1, wherein the surface area to volume ratio of the layer of polydisperse oil is in the range of from about 1 $cm^{-1}$ to about 10 $cm^{-1}$.

8. The method of claim 1, further comprising:
   flowing gas over the layer of polydisperse oil.

9. The method of claim 1, wherein heating is conducted under a partial vacuum.

10. The method of claim 1, wherein the surface is a ramp and the layer of polydisperse oil is formed over the surface of ramp.

11. The method of claim 2, wherein the polydisperse oil is a polydimethylsiloxane, and the VOCs having a molecular weight less than about 550 g/mol include linear siloxanes and cyclic siloxanes.

12. The method of claim 11, wherein the stripped polydisperse oil contains an amount of cyclic siloxanes having a molecular weight less than about 550 g/mol that is at least 20 times lower than that of the polydisperse oil, and an amount of linear siloxanes having a molecular weight less than about 550 g/mol that is at least 20 times lower than that of the polydisperse oil.

13. The method of claim 2, wherein the stripped polydisperse oil contains a VOC content that is at least 50 times lower than the polydisperse oil comprising VOCs, and the mass of the stripped polydisperse oil is within about 1% of the mass of the polydisperse oil.

* * * * *